United States Patent [19]

Göldner et al.

[11] Patent Number: 4,522,445
[45] Date of Patent: Jun. 11, 1985

[54] VEHICLE SEAT, PARTICULARLY A MOTOR VEHICLE SEAT

[75] Inventors: Walther Göldner, Denkendorf; Wolfgang Gassmann, Lorch, both of Fed. Rep. of Germany

[73] Assignee: Keiper Recaro GmbH & Co., Fed. Rep. of Germany

[21] Appl. No.: 452,118

[22] Filed: Dec. 22, 1982

[30] Foreign Application Priority Data

Dec. 23, 1981 [DE] Fed. Rep. of Germany ....... 3151018
Apr. 30, 1982 [DE] Fed. Rep. of Germany ....... 3216060

[51] Int. Cl.³ .................................................. A47C 3/00
[52] U.S. Cl. .................................... 297/284; 297/114; 297/464
[58] Field of Search ............... 297/284, 115, 116, 411, 297/417, 114, 464

[56] References Cited

U.S. PATENT DOCUMENTS

| | | | |
|---|---|---|---|
| 2,143,634 | 1/1939 | Saunders | 297/328 |
| 2,448,860 | 9/1948 | Collins | 297/284 |
| 2,690,208 | 9/1954 | Mary | 297/411 |
| 2,710,047 | 6/1955 | Duppstadt | 297/417 |
| 3,116,093 | 12/1963 | Bosack | 297/115 X |
| 3,161,076 | 12/1964 | Ferrara | 74/532 |
| 3,489,458 | 1/1970 | Karlsen | 297/417 |
| 3,542,325 | 11/1970 | Schwenk | 297/328 |
| 3,550,953 | 12/1970 | Neale | 297/284 |

FOREIGN PATENT DOCUMENTS 1630103 8/1971 Fed. Rep. of Germany ...... 297/417
5453 of 1903 United Kingdom ................ 297/116

Primary Examiner—Francis K. Zugel
Attorney, Agent, or Firm—Wigman & Cohen

[57] ABSTRACT

A vehicle seat includes at least one upholstered side member, which is arranged at the side adjacent to the seat upholstery that is connected with the upholstery support of the seat so as to be pivotable about an axis running in the lateral direction of the seat and that can be fixed at least in two different pivot positions by means of a locking device. The locking device has two cooperating members spaced from the pivot axis of which one passes by the other member during a pivot movement of the side member and cooperates therewith in selected positions when the locking device is closed.

19 Claims, 16 Drawing Figures

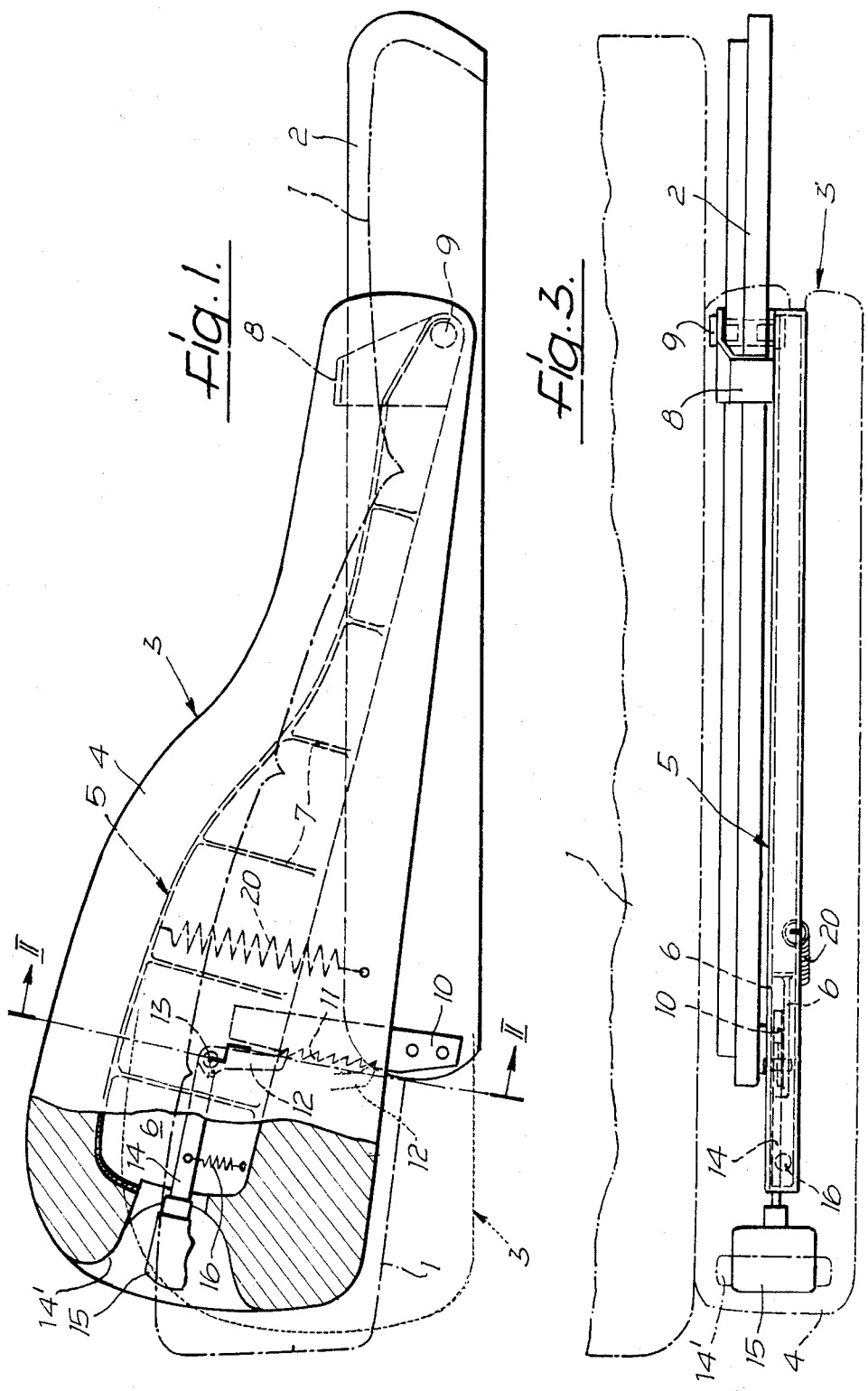

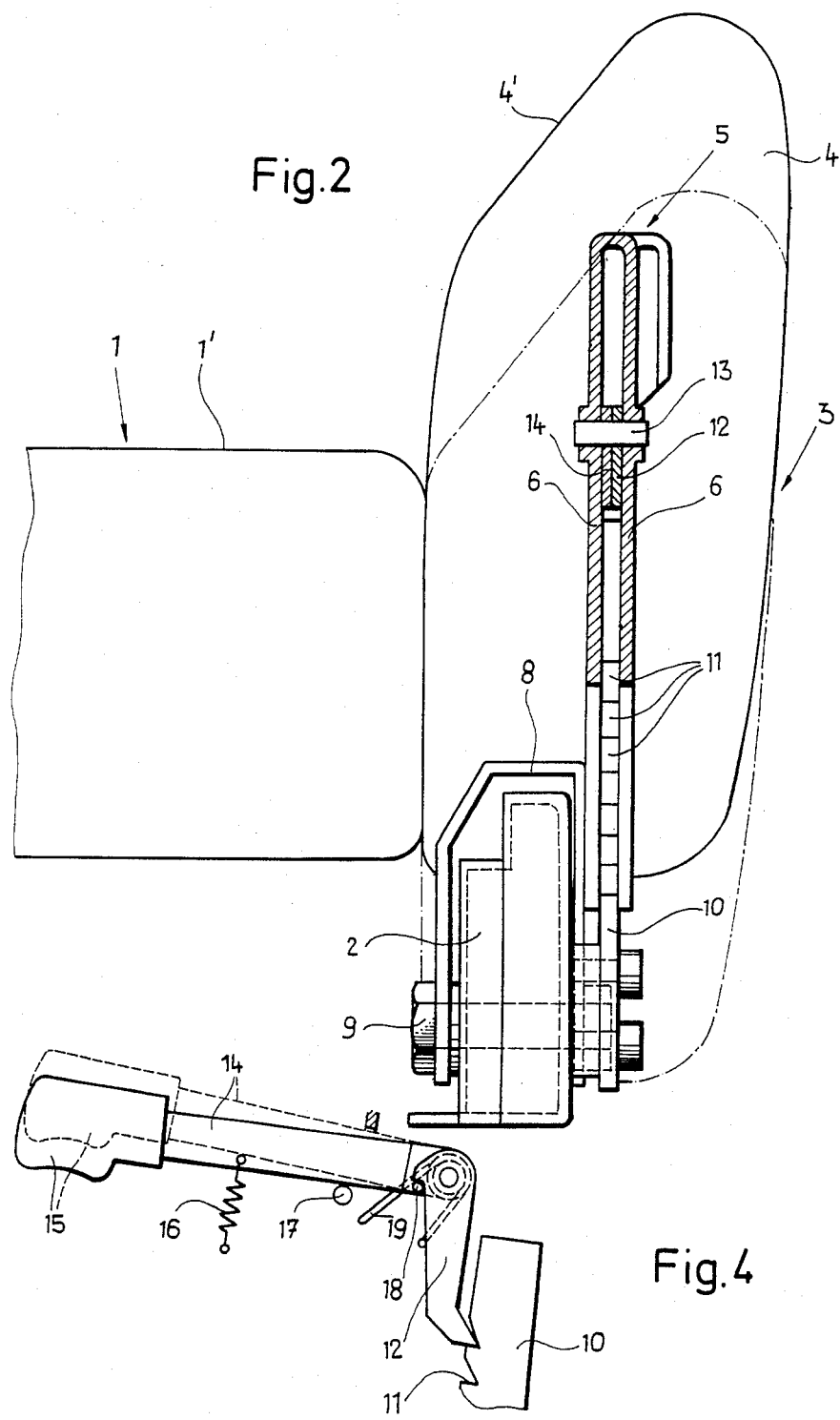

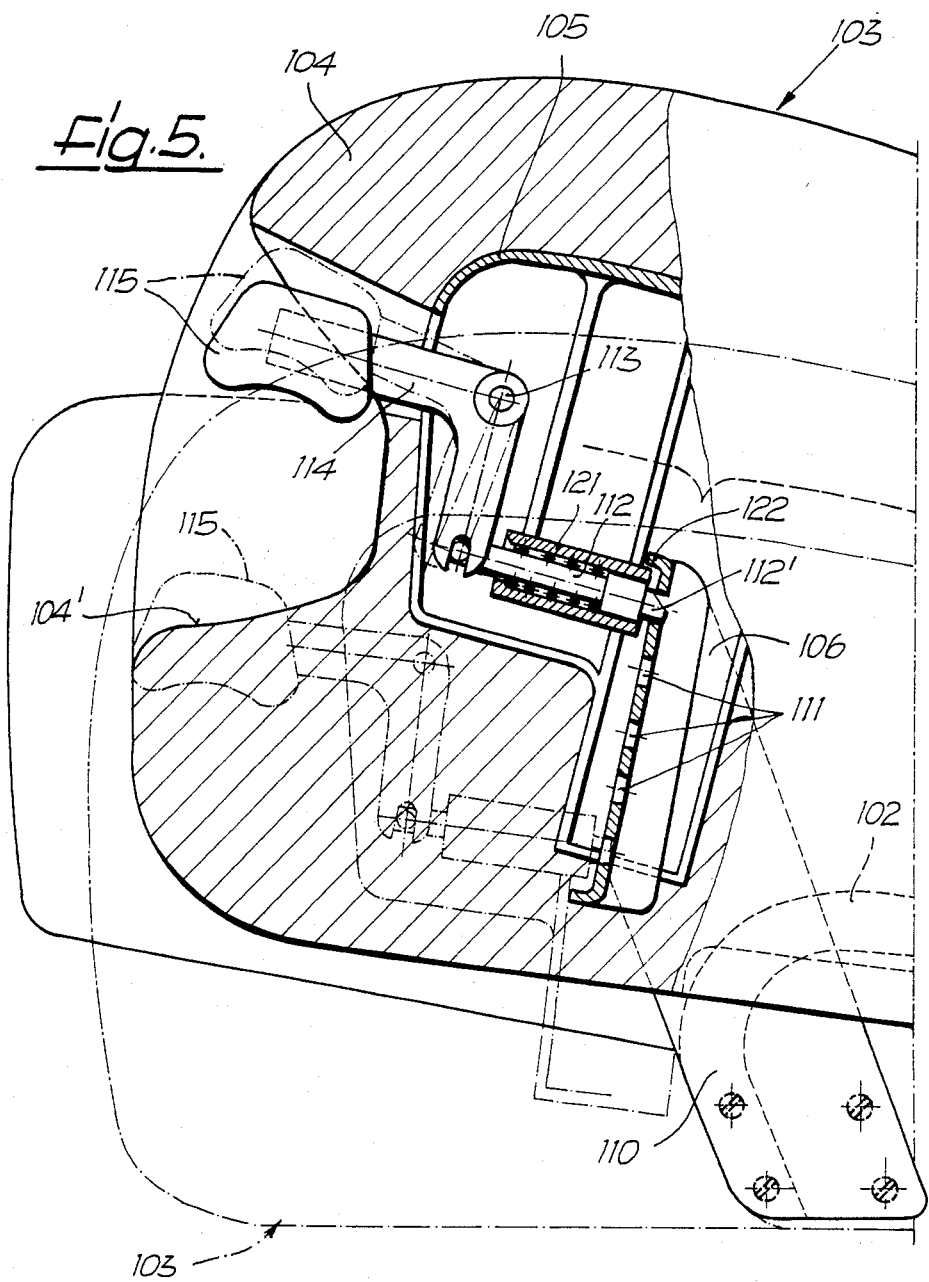

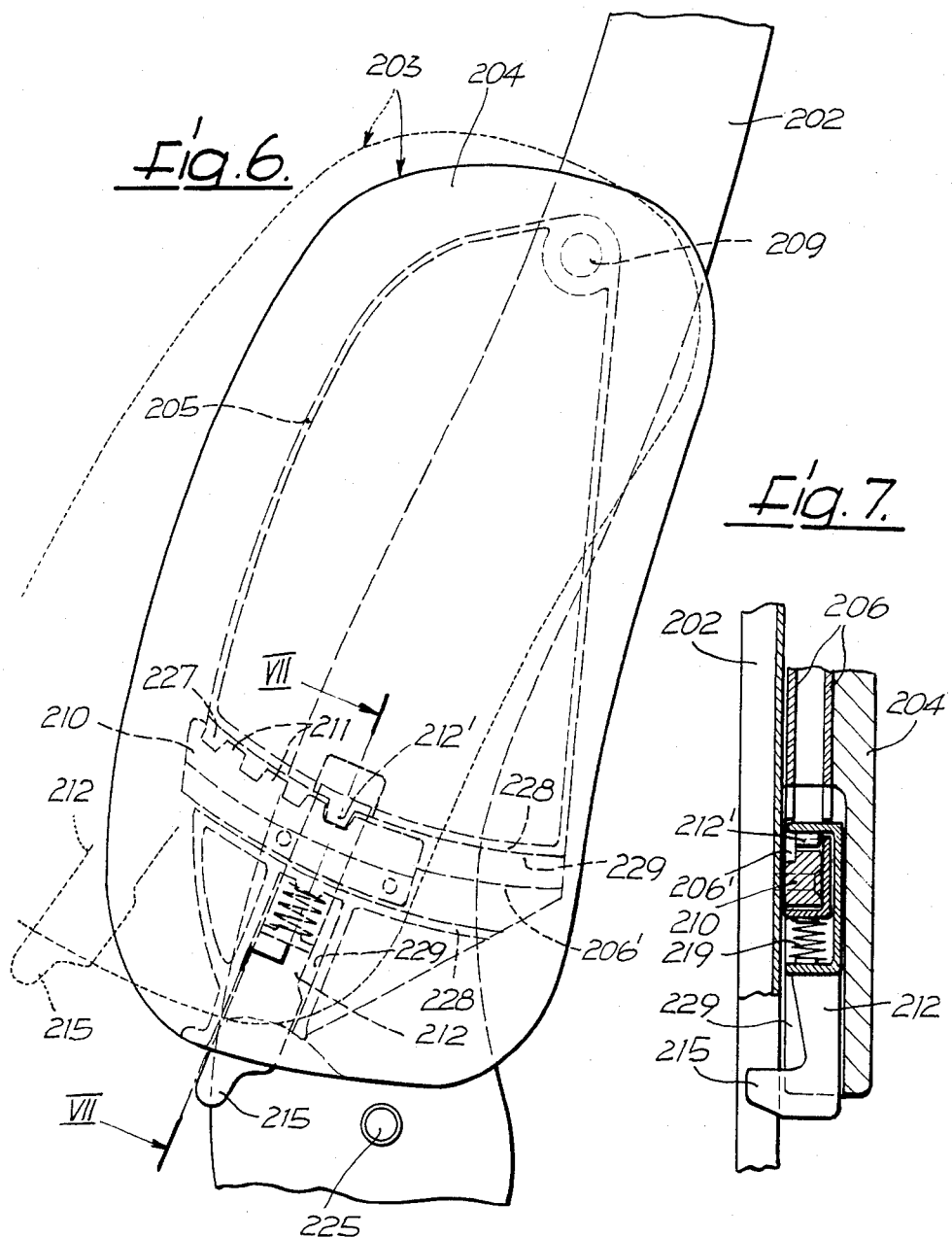

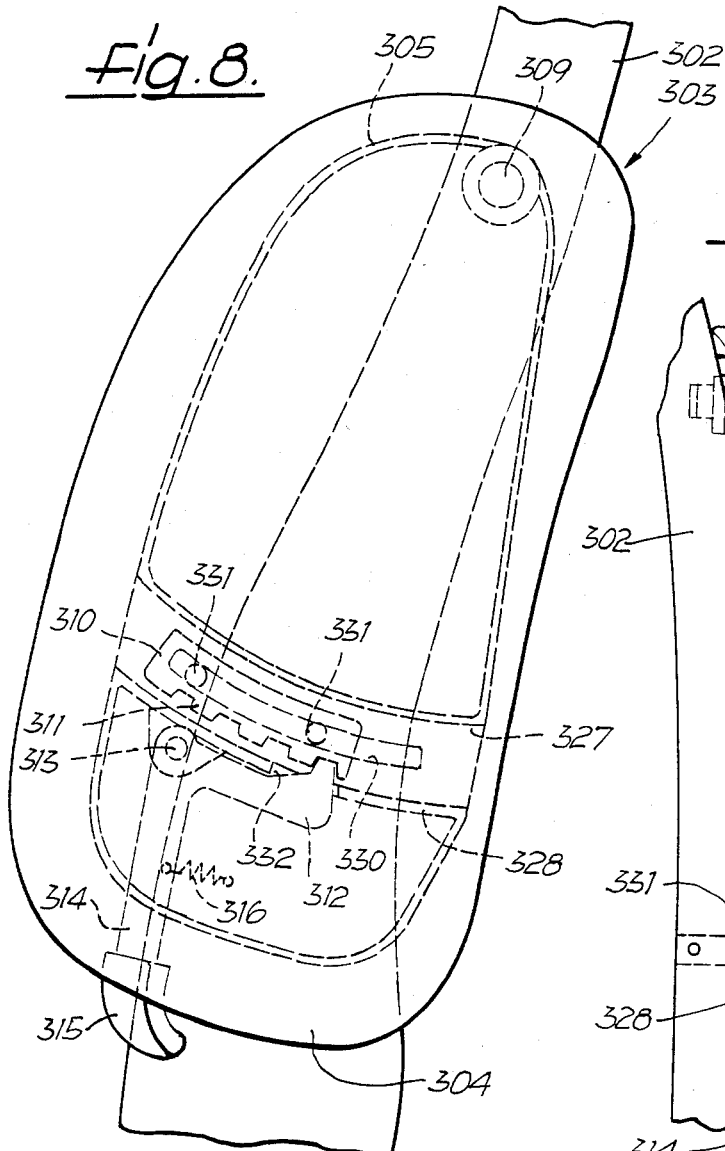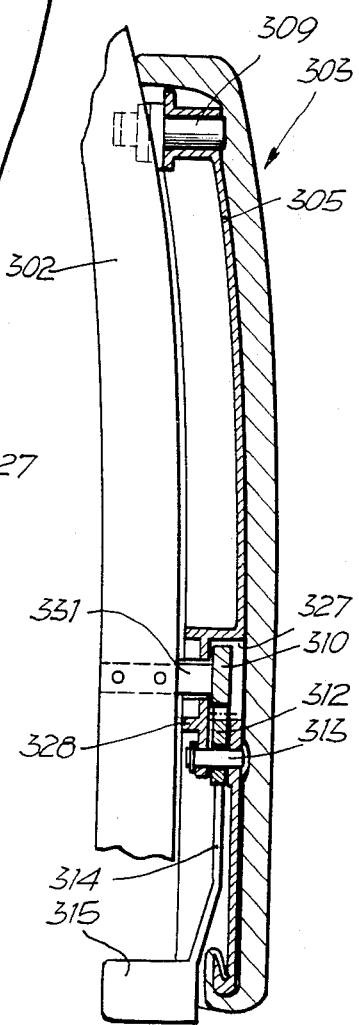

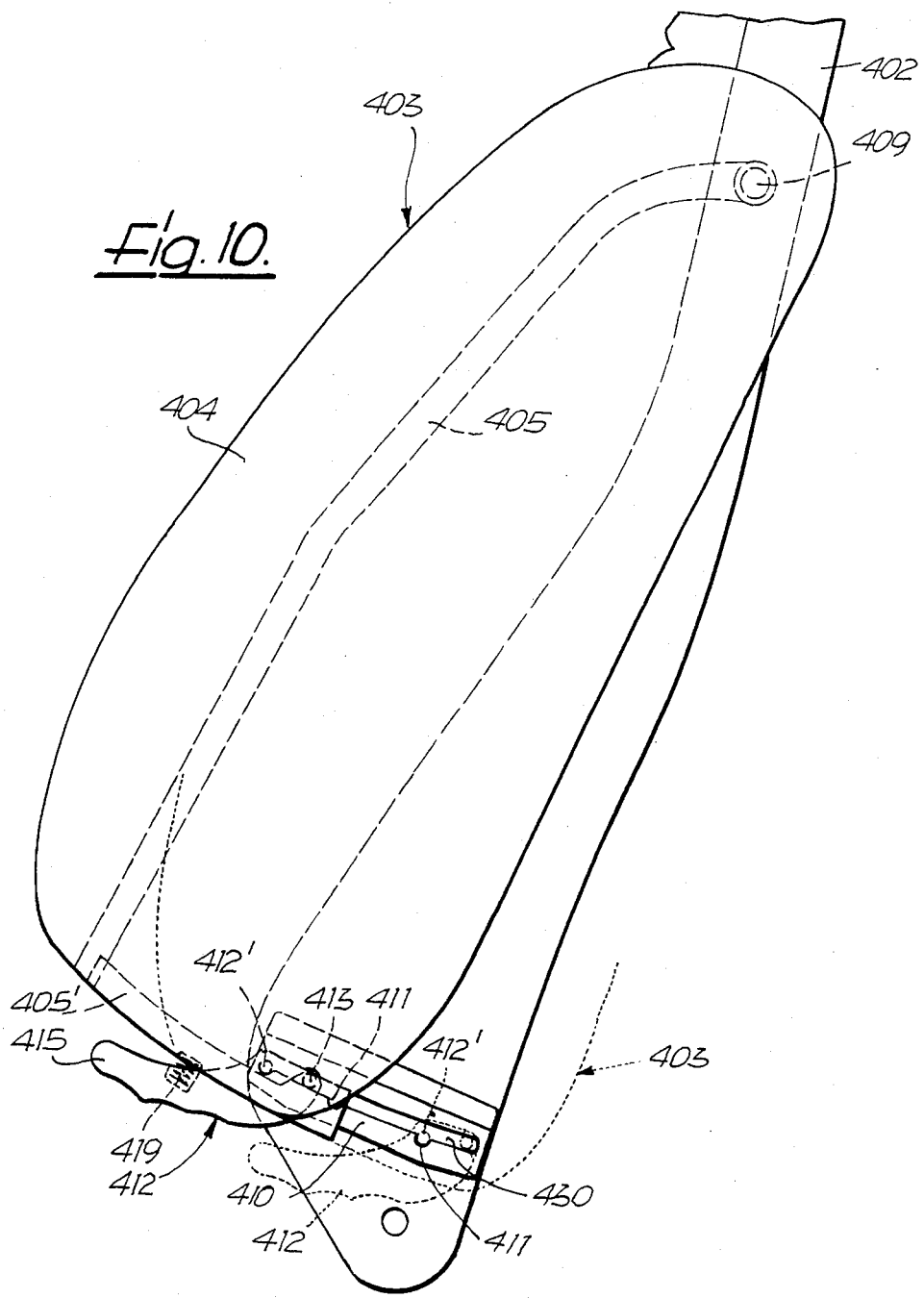

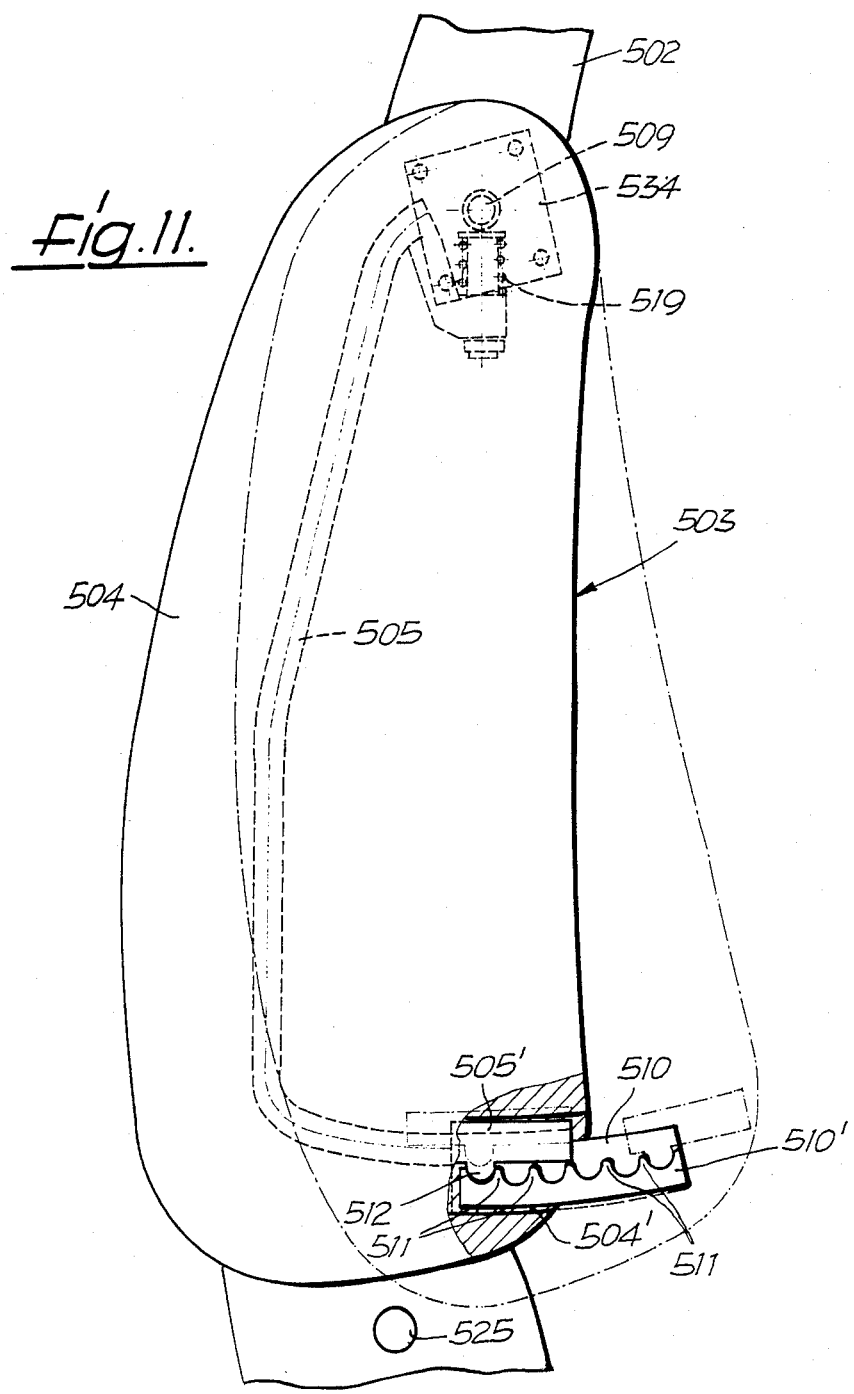

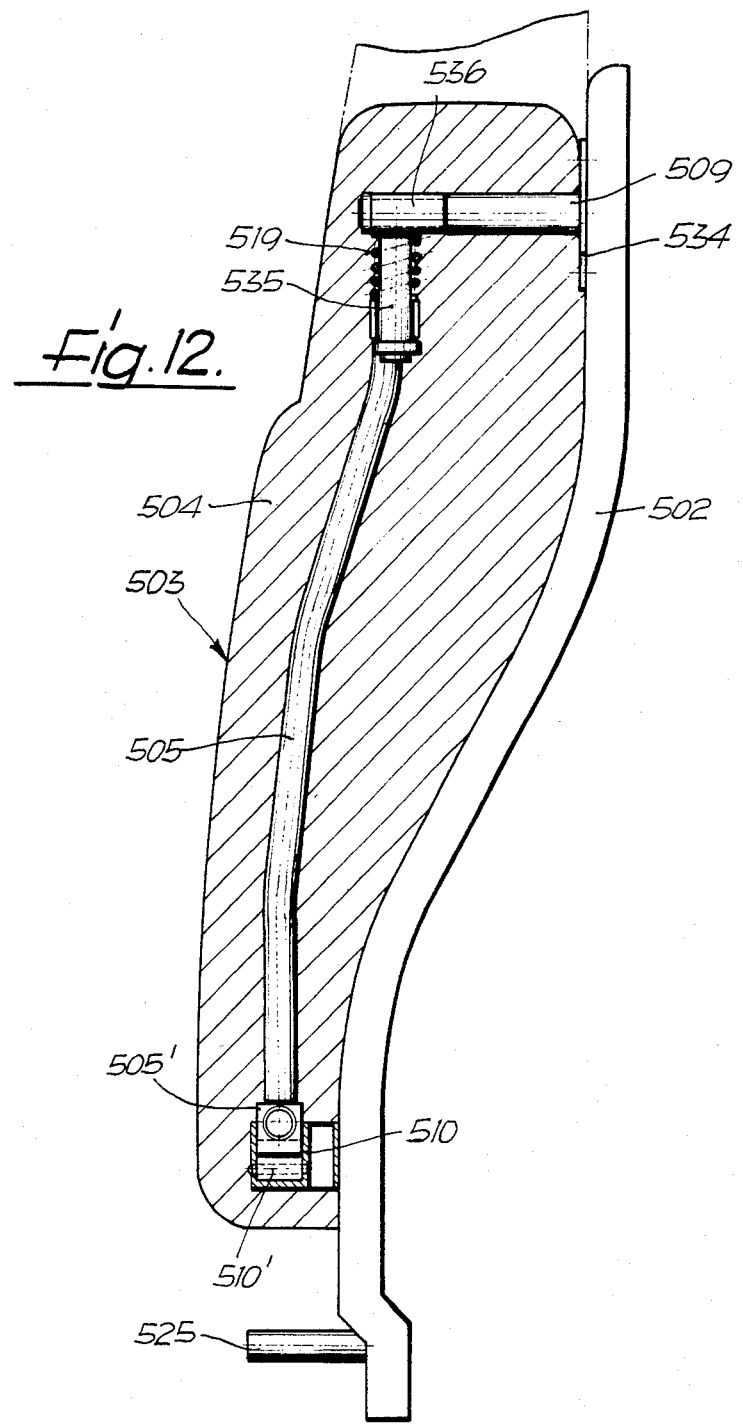

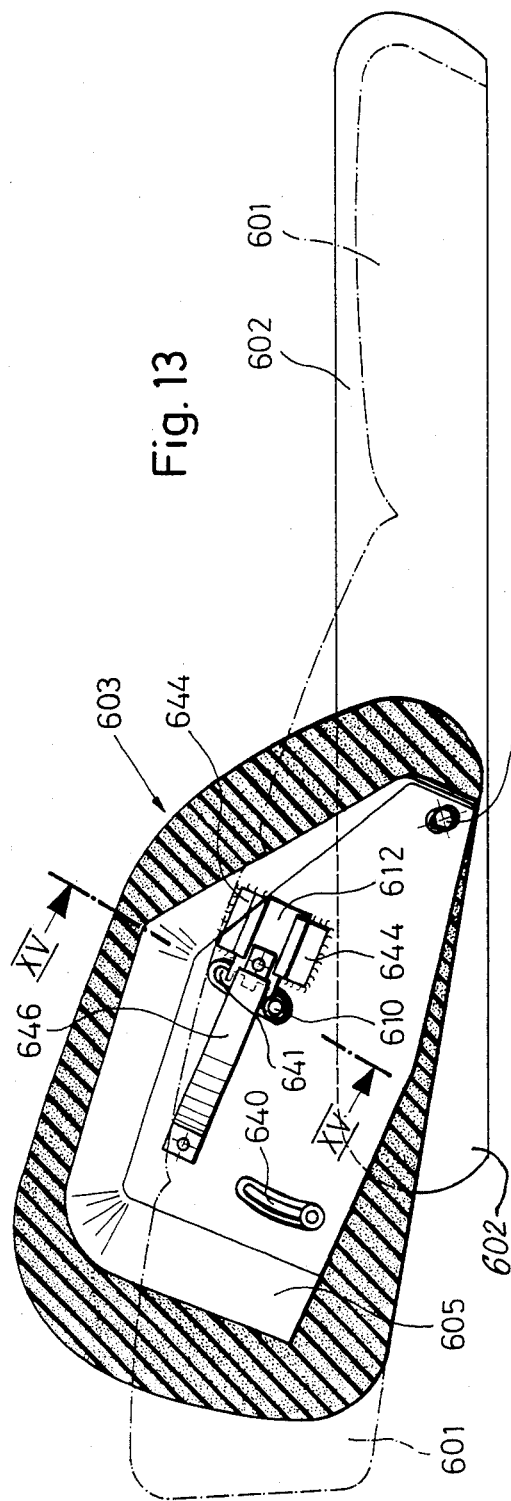
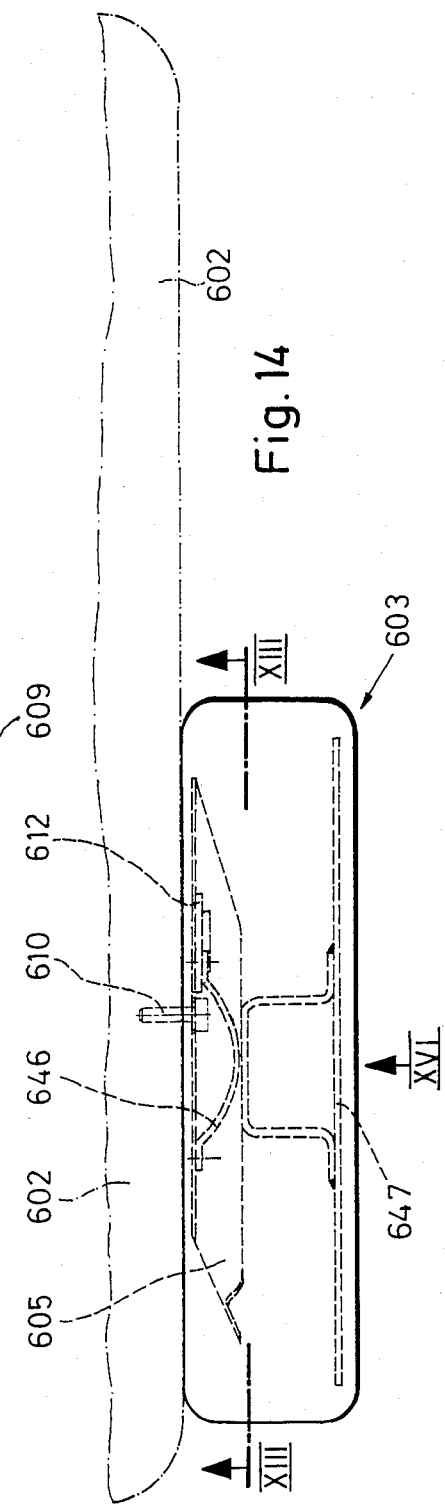
Fig. 13
Fig. 14

VEHICLE SEAT, PARTICULARLY A MOTOR VEHICLE SEAT

BACKGROUND OF THE INVENTION

1. Field of the Invention

The invention relates to a vehicle seat, particularly a motor vehicle seat.

2. Description of the Prior Art

The known vehicle seats of this type are subject to a number of disadvantages. For example, they have a relatively expensive design, they cannot be quickly and comfortably adjusted, and they do not permit adjustment in small increments. More favorable in this respect are other known vehicle seats, in which the side members can be pivoted about an axis extending in the longitudinal direction of the seat element or the back rest. Here, however, the space required for the seat in the lateral direction thereof is dependent on the pivot position of the side members, which is also inconvenient.

SUMMARY OF THE INVENTION

The object of the invention, therefore, is to create a vehicle seat, particularly for motor vehicles, in which each adjustable side member can be quickly and comfortably brought into the required or desired position, but which nevertheless has a simple construction, and which, by means of the fact that the required lateral space for the seat is independent of the side member position, permits an optimal use of the available space in the vehicle.

The solution according to the invention is advantageous both for seats having side members on the seat portion as well as for seats which only have side members on the back rest or on both the back rest and the seat portion. Furthermore, both side members of the seat portion and/or the back rest or even only the side member or members provided on the outside of the seat can be formed according to the invention.

The pivot range of the side members can be made as large as desired in an especially simple manner with an embodiment of a locking member.

Since, as a rule, a stepless adjustment of the side members is not necessary, in a preferred embodiment two locking members are formed.

Particularly advantageous is an embodiment of the vehicle seat according to the invention because, as a rule, no additional measures are then necessary in order to give the side members sufficient stability against forces acting on the side members in a lateral direction relative to the seat. With a view toward providing as simple a design as possible, it is also advantageous to provide the characteristics by means of which the lateral forces can be transferred into the upholstery support of the seat, and thereby into the seat frame, in an especially simply designed manner.

Another embodiment of the side members makes possible a change in the available width of the seat or support surface, without thereby changing the outer lateral dimensions of the seat.

For reasons of both cost and weight, it is advantageous to form the upholstery support of the side members.

With a view toward the most comfortable and rapid adjustment of the side members, in a preferred embodiment the locking device is formed. An adjustment of the side member can then take place at least in one pivot direction, without having to activate the activating member or the like of the detent mechanism. The characteristics of the invention also permit a rapid and comfortable adjustment of the side member because the seat user then only needs to exert an adjustment force on the side member in one pivot direction. In addition, these characteristics also contribute toward preventing the individual elements from rattling.

If, as is the case in a preferred embodiment, the detent element includes a pivotably mounted lever and also permits an adjustment of the side member in one pivot direction without an activation of the locking device, then another embodiment of the locking device is especially advantageous because it prevents a reciprocating movement of the handle of the activating member of the locking device during an adjustment of the side member.

If the detent element includes a pivotably mounted lever with a handle, then the portion of the detent element which engages in the detent points (detents) of the detent rail does not have to be a pawl provided on this lever. For example, a detent bolt which cooperates with the detent rail can be activated with the pivotable lever.

Because of its simple design, the embodiments which include a detent element are particularly advantageous.

Instead of a movement of the detent element relative to its supporting upholstery support by activating a handle or the like to release the locking device, it is also possible to provide a rigid connection of the detent element to its supporting upholstery support, when the seat according to the invention is formed, because then the entire side member can be moved in the sense of an engagement or disengagement of the detent element by the seat user.

Another embodiment having a simple design is achieved with the characteristics of the invention. In one version of this embodiment, it is possible to activate the movable locking member without moving the activating member out of the upholstery of the side member. Of course, in other embodiments it is also possible to move the one locking member by means of a bowed plate spring. One need only arrange the plate spring in such a manner that under a load the movable end of the spring moves in the sense of decreasing the outward curvature in the direction in which the locking element is moved out of its blocking position.

BRIEF DESCRIPTION OF THE DRAWINGS

The invention is described in greater detail below with the aid of exemplary embodiments illustrated in the drawings. Shown are:

FIG. 1 is an incomplete and partial cut-away side view of a first exemplary embodiment;

FIG. 2 is a section along the line II—II in FIG. 1;

FIG. 3 is a top view of the side member illustrated in FIG. 1 with the upholstery removed and a top view of the portion of the seat frame which supports the side members;

FIG. 4 is an enlarged section from FIG. 1;

FIG. 5 is an incomplete, partial longitudinal sectional view of a variation of the first exemplary embodiment;

FIG. 6 is an incomplete side view of a section of a second exemplary embodiment;

FIG. 7 is a section along the line VII—VII in FIG. 6;

FIG. 8 is a partially illustrated side view of a variation of the second exemplary embodiment;

FIG. 9 is a longitudinal section through the side member shown in FIG. 8 with the upholstery removed;

FIG. 10 is a partially illustrated side view of a third exemplary embodiment;

FIG. 11 is a partially illustrated side view of a fourth exemplary embodiment;

FIG. 12 is a longitudinal section through the side member shown in FIG. 11 and a partially illustrated view of the upholstery support of the back rest which supports this side member;

FIG. 13 is a longitudinal section through a fifth exemplary embodiment according to the line XIII—XIII in FIG. 14;

FIG. 14 is a top view of the fifth exemplary embodiment;

DETAILED DESCRIPTION OF THE PREFERRED EMBODIMENTS

Figure 15:
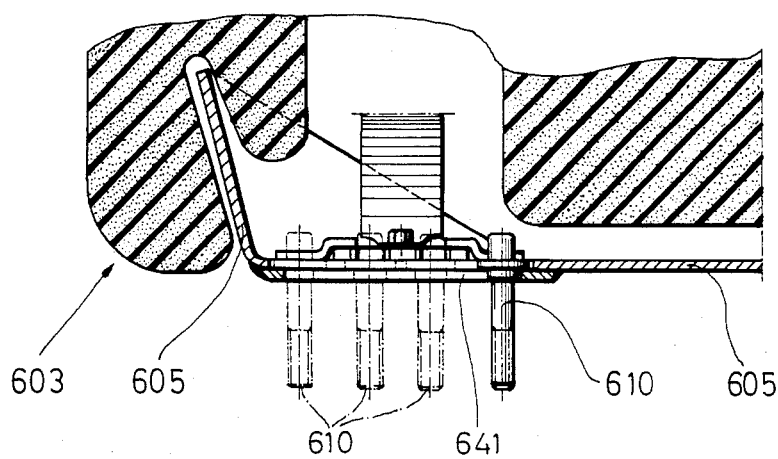
FIG. 15 is a section according to the line XV—XV in FIG. 13.

The first exemplary embodiment illustrated in the FIGS. 1 through 4 is a motor vehicle seat, of which only the seat portion upholstery 1, one longitudinal beam 2 of the upholstery support which supports the seat portion upholstery 1, and a side member 3 of the seat member are shown. The other side member of the seat, not shown, which is provided on the other side of the seat portion, is formed and arranged in the exemplary embodiment as a mirror image of the side member 3. It could, however, also have a different shape and arrangement, for example, by being nonadjustably connected with the upholstery support of the seat portion upholstery 1 or the seat frame, if the adjustability of the side member 3 lying on the outside of the seat is sufficient to simplify entry and exit and to change the seat width as well as the lateral support.

As shown in FIG. 2, the side member 3 includes an upholstery element 4, the exterior cross-sectional shape of which differs from an upright rectangle with rounded corners primarily only in that the area of the upper, inward-lying corner is missing. By this means, the upper portion 4' of the inner side surface forms an acute angle with the pivot plane in which the lower portion of this side surface lies, and forms an obtuse angle with the adjacent support surface 1' of the seat upholstery portion 1. The transition from the upper portion 4' of the side surface to the lower portion lies at the level of the adjacent support surface 1', if the side member 3 is in its lowermost position, where it has the smallest amount of overlap with the adjacent support surface 1'. This transition, however, could also lie somewhat lower or somewhat higher. This position is shown in FIG. 2 with broken lines. In this position, the seat width available to the seat user is at its maximum. In its uppermost position, the side member 3 assumes the position illustrated with solid lines in FIG. 2. In this position, the seat width available to the seat user has its smallest value. The elastic yield of the upholstery element 4 in the lateral direction of the seat, however, is sufficiently large that the upholstery can adapt to the shape of the thighs of the seat user. Therefore, even the bend present at the transition from upper portion 4' of the inner side surface to the lower portion of this side surface present in the unloaded condition of the upholstery element 4 is not troublesome, but rather more or less disappears completely under a load. The lateral space required for the seat is not changed by a change in the position of the side member 3 for purposes of changing the seat width, which is a significant advantage.

The height of the upholstery element 4 in the exemplary embodiment as shown in FIG. 1 is about twice as high in the front half as in the rear half. By this means, the adjustment of the side member 3 has a practical effect on the seat width available to the seat user and his lateral support only in its front half. Furthermore, in the exemplary embodiment the side member 3 and its pivot range are selected in such a manner that the front half of the upholstery element 4 still overlaps the support surface 1' even in the lowest position of the side member 3. Of course, however, in the lowest position of the side member 3, the upper portion 4' of the upholstery element 4 could also lie in the plane defined by the support surface 1' of the seat upholstery portion 1 so that the seat is only widened, no longer giving the seat user any lateral support.

An upholstery support 5, which in the exemplary embodiment is made of plastic but could also be a metal body, is arranged in the interior of the upholstery element 4. The upholstery support 5 includes two, slightly spaced, adjacent, smooth plates 6, which extend in the direction of the height and the length of the upholstery element 4 and therefore lie in vertical planes in the exemplary embodiment. The two plates 6, the height of which decreases toward the rear ends thereof, are formed in one piece with each other and are joined along their upper edges by a web (unnumbered). Upwardly and downwardly extending spaced ribs 7 shown in FIG. 1 also connect the two plates 6 and form downwardly open pockets.

The rear end of the plate 6 facing the seat portion is connected with one shank of a somewhat U-shaped mounting body 8, shown in FIGS. 1 and 2, which body 8 overlaps the top of the longitudinal beam 2. A screw 9, which penetrates the two shanks of the mounting body 8 as well as the longitudinal beam 2 in the lateral direction of the seat, forms a pivot axis about which the side member 3 can be pivoted. Accordingly, in the exemplary embodiment, the pivoting movement of the side member 3 takes place in a vertical plane lying parallel to the longitudinal direction of the seat.

In the area of the forward end of the longitudinal beam 2, there is attached the lower end of an upwardly directed rail 10, which engages between the two plates 6 in the vicinity of one of the pockets formed by the ribs 7, namely in the area of the front end section of the upholstery support 5, and does so with little or no play. Therefore, during a pivoting motion, the upholstery support 5 is guided not only by the screw 9, but also by the rail 10. In addition, the rail 10 assumes lateral forces exerted on the side member 3 and transfers them into the longitudinal beam 2.

The forward edge of the rail 10, as shown in FIG. 1, is formed as a toothed bar, the teeth of which have a sawtooth shape. The upper flanks of the teeth 11 thereby stand perpendicular to the longitudinal direction of the rail 10, while the lower flanks form an acute angle with the longitudinal direction of the rail 10.

Due to the teeth 11, the rail 10 also forms a detent rail of a locking device, by means of which the side member 3 can be held in the selectable pivot positions. This locking device includes a pawl 12 as the member which cooperates with the rail 10, which pawl 12 is pivotably mounted on a rod 13 which lies parallel to the screw 9 and is held in the plates 6. From this point, this rod 13 extends downwardly, engaging with its bent free end between the teeth 11. A flat activating lever 14 is mounted next to the pawl 12 on the rod 13, which activating lever 14 projects forward out of the upholstery support 5, thereby supporting a handle 15. In order for the seat user to be able to grasp this handle 15 and pull upward against the force of a return spring 16 engaging the activating lever 14 while simultaneously assuring that the handle 15 is not in the way, as shown in FIG. 1, the forward end of the upholstery element 4 includes a forwardly open depression 14', in which the handle 15 accessibly lies. As shown in FIG. 4, the downward limit of the pivot range of the activating lever 14 is defined by a stop pin 17. During an upward pivot movement, a carrier pin 18, which thereby abuts a projection of the pawl 12, carries the pawl 12 against the force of a shank spring 19, which is biased so as to attempt to hold the pawl 12 in engagement with the teeth 11. As a result of the saw-tooth shape of the teeth 11, the side member 3 can only be pivoted downwardly, after the handle 15 has been pulled upward, whereby the seat user, to accomplish this object, lays his hand on the upper side of the upholstery element 4. A prebiased draw spring 20 shown in FIG. 3, which engages on one end against the longitudinal beam 2 and on the other end against the upholstery support 5, then pivots the side member 3 downward to the extent desired by the seat user. A locking in the new position is achieved by releasing the handle 15. In order to pivot the side member 3 upward, the seat user only needs to grasp beneath the forward end of the side member 3 or to reach into the open depression 14' and to pull upward by the desired amount. The pawl 12 then slides past the teeth 11, due to the saw-tooth shape thereof. The activating lever 14 and the handle 15 do not move in this process, since, as shown in FIG. 4, the pawl 12 cannot transfer clockwise rotational movement to the activating lever 14.

The adjustment of the side member 3 is thus extremely simple and comfortable. In addition, relatively small steps can be achieved over the entire adjustment range, since it is not difficult to provide the rail 10 with sufficiently small teeth 11. A further advantage is the play-free guiding of the side member 13. Due to the draw spring 20 and the shank spring 19, furthermore, the locking device cannot rattle, even under heavy shaking.

Of course, it would also be possible to provide the saw-tooth shape in the reverse direction so that pressure from above on the side member 3 is sufficient in order to pivot the side member 3 downward, particularly to facilitate exit. To the extent that it is not necessary to form fittingly lock the side members 3 against a downward pivoting movement, both flanks of the teeth 11 can also have a sufficiently severe angle to allow for an adjustment without having to lift the pawl 12 by means of the activating lever 14. The activating lever 14 and the handle 15 could then be eliminated.

The variation of the first exemplary embodiment illustrated in FIG. 5 differs from the first exemplary embodiment only with respect to the embodiment of the locking device. Corresponding elements are therefore designated with numbers increased by 100, and the following description is limited to the changes resulting from the variations.

The rail 110 attached to the longitudinal beam 102, which rail 110 extends upwardly into the upholstery support 105 of the side member 103 and engages there with little or no play, is bent at its upper end into the shape of a U, whereby the two shanks of the U abut the plates 106 of the upholstery support 105. The web extending in the direction of the height of the upholstery support 105 is provided with bores 111, which form a row extending in the pivoting direction of the side member 102 and serve as detents. The detent element which cooperates with these detents is formed by a spring-loaded detent bolt 112, which is guided in a sleeve 121 so as to be longitudinally movable but nonrotatable. The detent bolt 112 and the sleeve 121 form a common commercial structural item which is mounted in the upholstery support 105 in such a manner that the free end 112' of the detent bolt 112 can penetrate into the bores 111. Element 122 of the U-shaped upper end of the rail 110, which is bent toward the sleeve 121, serves as a stop 122 for the sleeve 121 and thereby limits the pivot range of the side member 103.

As shown in FIG. 5, the rear end of the detent bolt 112 is provided with a lateral pin (unnumbered) which engages in a longitudinal slot in an activating lever 114 formed as an angled lever. This activating lever 114 is pivotably mounted on a pin 113 and one arm thereof, together with the handle 115 located thereon, projects into a depression 104' provided in the front side of the upholstery element 104.

If it is desired to adjust the side member 103 in one pivot direction without having to activate the handle 115, the free end 112' of the detent bolt 112, which cooperates with the bores 111, can be angled, as shown in FIG. 5.

The exemplary embodiment according to FIGS. 6 and 7 is a motor vehicle seat with a backrest which pivots about an axis 225 and includes a side member 203 on the side visible in FIG. 6. Another side member (not shown) which is formed and arranged as a mirror image of the side member 203 is provided on the other side of the back rest. All that is shown of this seat, however, is a portion of a longitudinal upholstery support 202 for the back rest upholstery and the side member 203. The seat can also include side members 203 in the area of the seat portion which in principle could be formed like the side members 203. But, of course, it would also be possible to provide side members 203 in accordance with FIGS. 1 through 5 of the seat portion, which of course can also be used as side members 203 for a back rest, provided they are given a shape appropriate for that purpose.

The side member 203 serves to provide lateral support to the seat user from the lumbar region up to the lower portion of the chest. The upholstery element 204 of the side member 203 therefore extends over this area. It is supported by an internal upholstery support 205, the upper end of which, as shown in FIG. 6, is connected with the longitudinal upholstery support 202 of the back rest so as to be pivotable about an axis 209 lying parallel to the pivot axis 226 of the back rest. The side member 203 can therefore be pivoted forward and backward at the side of the longitudinal upholstery support 202 in an essentially vertical plane, whereby the lower end of the side member 203 undergoes the maximum pivot path. The overlap of the side member 203 over the internal upholstery element 204 of the back rest is, of course, dependent on the longitudinal shape of the back rest, but is sufficiently large to give the seat user good lateral support.

The internal upholstery support 205 could be made of metal, but in the exemplary embodiment it is a plastic body having two spaced, adjacent plates 206 (FIG. 7), which are connected at their edges and by ribs (not shown), thereby forming a hollow body which is indeed narrow, yet rigid.

As shown in FIG. 6, in its lower half the internal upholstery support 205 forms a groove 227 which extends along a circular arc about the axis 209. The walls 228 which form the sides of this groove 227 run parallel to each other and define the shape of the groove 227 which has a rectangular cross section. The groove 227 is open toward the longitudinal upholstery support 202 of the back rest only over a portion of its width, because the plate 206 lying closest to the longitudinal upholstery support 202 and having a strip-like section 206' extends beyond the wall 228 lying closest to the axis 209, as shown in FIG. 6. A rail 210, which in the exemplary embodiment is made of metal, lies in the groove 227 and is curved to correspond to the course of the groove 227. This rail 210 is attached to the longitudinal upholstery support 202, for example, with screws or rivets (unnumbered). As shown in FIG. 7, this rail 210 has an L-shaped cross section. Because one of its shanks engages behind the strip-like section 206', the rail 210 forms a guide for the internal upholstery support 205, which also takes up forces acting in the lateral direction of the seat and can transfer them into the longitudinal upholstery support 202 of the back rest.

At the same time, the rail 210 forms one member of a locking device, by means of which the side member 203 can be locked in selectable pivot positions. The shank of the rail 210 which engages behind the strip-like section 206' and is directed toward the axis 209 is therefore provided with trapezoidal teeth 211 pointing toward the axis 209, which teeth 211 thus result in a toothed bar running in the longitudinal direction of the groove 227, forming a detent between each pair of adjacent teeth 211.

The other member of the locking device is formed by a slide 212, which can be moved in a sliding manner in a guide 229 of the upholstery support 205 which runs radially with respect to the axis 209. The slide 212 is mounted in a form-fitting manner so as to prevent a lateral shifting. As shown in FIG. 7, the end of the slide 212 directed toward the axis 209 has a hook-like shape. This hook-like end extends into a guide slot in the plate 206 lying further away from the longitudinal upholstery support 202, and engages behind the shank of the rail 210 which includes the teeth 211. In this manner, even the slide 212 contributes to the ability of this design to transfer forces, acting on the side member 203 in the lateral direction of the back rest, to be conducted into the rail 210. As further shown in FIG. 7, a tooth-like projection 212' is formed on the yoke portion of the hook-like end section of the slide 212. The cross-sectional shape of this projection 212' is adapted to the shape of the detents formed between the teeth 211, since this projection 212' engages in one of these detents in the locking position, as shown in FIG. 6, so that the side member 203 form-fittingly locks against a pivoting movement. A prebiased helical spring 219, which lies in the guide 229 like the slide 212 and is supported on one side against the slide 212 and on the other side against the wall 228 lying farther away from the axis 209, attempts to hold the projection 212' of the slide 212 in engagement with the rail 210. In order to be able to pivot the side member 203, the seat user must push the slide 212 far enough upward that the projection 212' comes out of engagement with the detent. The seat user performs this by means of a handle 215, which is formed on the downwardly directed end of the slide 212 and projects downwardly somewhat beyond the side member 203. After the side member 203 has subsequently been pivoted, for example from the position shown in FIG. 6 with solid lines into the position shown with broken lines, the seat user need only release the handle 215. Due to the helical spring 219, the slide 212 then moves back into the locking position. It may still be necessary to slightly correct the pivot position of the side member 203 in order for the projection 212' to align with a detent.

In the variations of the second exemplary embodiment shown in FIGS. 8 and 9, the drawings illustrate a vehicle seat like that in the variation according to FIGS. 6 and 7, where the back rest is provided with suspended side members 303 arranged so as to be capable of pivoting about an axis lying parallel to the pivot axis 309 of the back rest. Because these variations basically differ from those according to FIGS. 6 and 7 only by a different embodiment of the locking device, only this difference is described below. Furthermore, as with the other exemplary embodiments, corresponding elements are provided with reference numerals that are the same in the ones and tens positions.

The groove 327 of the internal upholstery support 305 of the side member 303, which groove 327 runs along a circular arc concentric to the pivot axis 309, is outwardly open and includes a slot 330 running in the longitudinal direction of the groove 327 in the web which forms the base of the groove 327. Two spacing bolts 331 penetrate this slot 330, which bolts 331 are rigidly connected with the longitudinal upholstery support 302 of the back rest and which rigidly connect the rail 310 lying in the groove 327 with the longitudinal upholstery support 302. The rail 310 thus also in this embodiment form-fittingly conducts the forces acting on the side member 303 in the lateral direction of the back rest into the longitudinal upholstery support 302 of the back rest.

An opening 332, which is penetrated by a pawl 312, is provided in the wall 328, which is farthest away from the pivot axis 309 and defines one side of the groove 327. The pawl 312 is pivotably mounted on a pin 313 which lies parallel to the pivot axis 309 and is fixed in place in the internal upholstery support 305. Together with the rail 310, which includes an edge strip provided with teeth 311, pairs of which form detents, this pawl 312 forms the locking device. The shape of the detents and the shape of the free pawl end adapted thereto are selected in such a manner that in the locked condition the side member 303 is form-fittingly secured against pivoting. To activate the pawl 312, an activating lever 314 is formed thereon which extends downward from the pin 313 approximately at a right angle to the pawl 312. The handle 315 of this activating lever 314, which projects downwardly beyond the upholstery element 304 of the side member 303, must be pulled forward by the seat user against the force of a return spring 316, which acts on the activating lever 314, in order to disengage the pawl 312. After the desired new pivot position of the side member 303 is reached, the handle 315 is again released. The return spring 316 then assures an automatic locking. If necessary, in order to enable the pawl 312 to engage in the detent, the pivot position must be slightly corrected.

The third exemplary embodiment illustrated in FIG. 10 corresponds with the exemplary embodiment according to FIGS. 6 through 9 with respect to the shape and hinging of its side member 403 on the longitudinal upholstery support 402 of the back rest. It is distinguished therefrom by a different embodiment of the locking device and by the fact that the internal upholstery support 405 of the side member 403 is a tubular frame. The locking of this exemplary embodiment, however, could also be provided with a side member 403 having a plastic body as an upholstery support 402 or 405. Furthermore, it should also be mentioned that, as in the other exemplary embodiments, the side member 403 provided on the other side of the back rest is formed and arranged as a mirror image of the other and that this side member design is basically also possible for the seat portion.

A rail 410 is attached, for example by welding or riveting, to the side of the longitudinal upholstery support 402 of the back rest facing the side member 403. This metal rail 410 has a Z-shaped cross section. The shank spaced from the longitudinal upholstery support 402 and downwardly directed, i.e, away from the pivot axis 409, is provided with a longitudinal slot 430, which runs along a circular arc section lying concentric to the pivot axis 409. In the edge strip of the rail 410 defining the bottom of the longitudinal slot 430 are provided spaced detents 411 which are open toward the longitudinal slot 430 and have, in the exemplary embodiment, a semi-circular cross-sectional shape.

The shank of the rail 410 provided with the longitudinal slot 430 overlaps from beneath a U-shaped rail 405', which forms the portion of the internal upholstery support 405 of the side member 403 extending along the lower end of said side member 403. Therefore, in this exemplary embodiment, too, the rail 410 forms a guide for the end of the side member 403 farthest removed from the pivot axis 409 and takes up form-fitting forces acting on the side member 403 in the lateral direction of the back rest.

The U-shaped rail 405' is covered from beneath an end section of a pawl 412, which also has a U-shaped cross section and is pivotably mounted on a pin 413 lying parallel to the pivot axis 409. This pin 413 penetrates the longitudinal slot 430 and is fixed in the U-shaped rail 405'. A pawl pin 412' is arranged in the pawl 412 parallel to the pin 413 and is spaced at a distance therefrom. In the selected pivot position, this pawl pin 412' engages in one of the detents 411. A prebiased helical spring 419, which is supported on one side against the U-shaped rail 405' and on the other side against the pawl 412, attempts to hold the pawl pin 412' in engagement with the selected detent 411. In order to change the pivot position of the side member 403, the seat user must push the free end of the pawl 412, which is formed as a handle 415 and projects downwardly out of the upholstery element 404 of the side member 403, upward against the force of the spring 419. The thus induced pivot movement of the pawl 412 causes the pawl pin 412' to disengage from the detent 411 and to enter the longitudinal slot 430. The side member 403 can then be pivoted, whereby the pin 413 forming not only the pivot axis of the pawl 412, but also the pawl pin 412' can be moved in the longitudinal slot 430. In the desired new pivot position, the handle 415 is then released. After an aligning of the pawl pin 412' with one of the detents 411, which may be necessary, the side member 403 is again automatically locked.

In contrast to the above-described exemplary embodiments, in the exemplary embodiment according to FIGS. 11 and 12, the side member 503, which in the exemplary embodiments according to FIGS. 6 through 10 is provided on the back rest of a motor vehicle but could also be provided on the seat portion of such a seat, is pivotable about not only one axis 509 running laterally to the direction of the seat. Side member 503 is also connected with this pivot axis 509 in such a manner as to be slidable in a radial direction relative to said pivot axis 509. For this reason, a bar 535 referenced only in FIG. 12 projects radially from the pivot axis 509, which is arranged parallel to the axis 525 about which the back rest can be pivoted relative to the seat portion and which is rigidly connected with the longitudinal upholstery support 502 of the back rest by means of a plate 534. This bar 535 has a shape with multiple faces or flat surfaces and is supported by a rotatable but axially fixed sleeve 536 mounted on the axis 509. The upper end of the internal upholstery support 505 of the side member 503, which support 505 is formed as a tubular frame, is guided on the bar 535 so as to be slidable in the longitudinal direction thereof, but nonrotatable. A prebiased helical spring 519, which is located around the bar 535, presses the end of the internal upholstery support 505 slidably mounted on the bar 535 against the free end of the bar 535, which results in a load on the side member 503 in the sense of a downward shifting.

A rail 510, which in the exemplary embodiment is made of metal, is attached to the side of the upholstery support 502 facing the side member 503 at the level of the lower end of the side member 503. This rail 510 forms a U shape open toward the axis 509 and extends in the direction of a circular arc concentric to the axis 509, or, because of the small degree of curvature of this arc, it can also be made straight, which is also true for the above-described exemplary embodiments. The upholstery element 504 of the side member 503 includes a depression 504' shown only in FIG. 11 directed toward the rail 510, in which said rail 510 engages. The lower end of the internal upholstery support 505 of the side member 503 also projects into the depression 504'. In the exemplary embodiment, this end is formed in such a manner that it engages in the U shape of the rail 510. However, the one shank of the rail 510 could also overlap the rail 510 from above. In both cases, the rail 510 forms an additional guide for the side member 503, which form-fittingly takes up forces acting on the side member 503 in the lateral direction of the seat.

A toothed bar 510' having upwardly directed teeth 511 lies in the rail 510. This toothed bar 510' is rigidly connected with the rail 510, for example by means of lateral pins. A guide body 505', which forms the lower end of the internal upholstery support 505 of the side member 503 and has a four-sided shape adapted to the U shape of the rail 510, includes a downwardly overlapping detent tooth 512, which, like the free end of the pawl of the previously described exemplary embodiments, engages between two of the teeth 511 and thereby secures the side member 503 in the selected pivot position.

In order to bring the side member 503 into another pivot position, the seat user must pull or press it upward against the force of the spring 519, i.e., toward the axis 509. This action disengages the detent tooth 512. After the side member 503 has been brought into its new pivot position, the side member 503 is again released. It then moves downward under the force of the spring 519, whereby the detent tooth 512 again engages between two of the teeth 511.

To the extent that the lower end of the internal upholstery support 505 of the side member 503 overlaps one shank of the rail 510, this shank can be formed as a toothed bar 510'. The detent tooth 512 can then be formed, for example, by a lateral pin, which is fixed in the two shanks of the internal upholstery support 505 which overlaps the rail 510.

Figure 16:
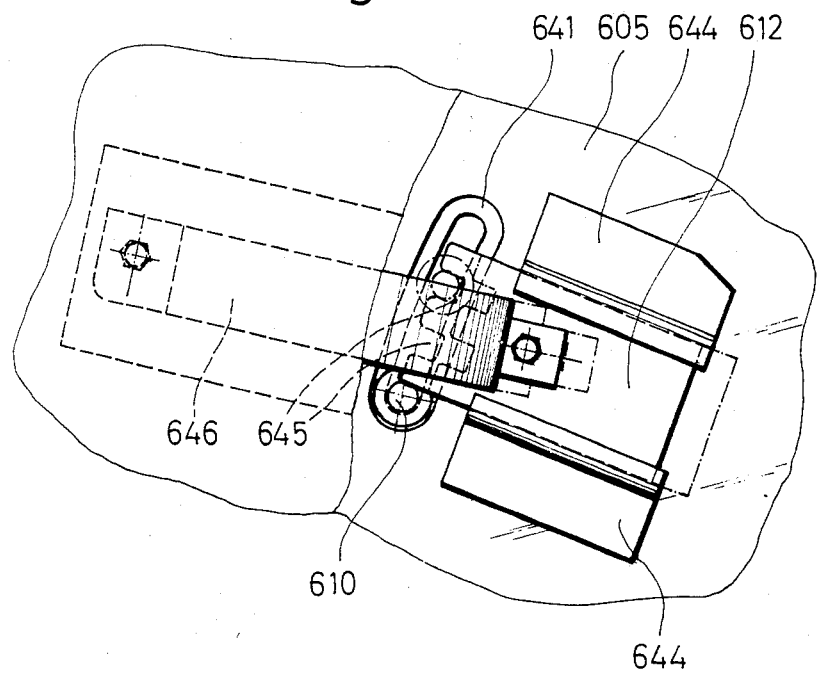
FIG. 16 is an enlarged section of FIG. 13.

The fifth exemplary embodiment of the motor vehicle seat according to the invention, as illustrated in the FIGS. 13 through 16, includes a side member 603 at least on the one side of the seat element, which side member 603 is pivotably hinged to the longitudinal beam support 602 of the seat portion upholstery 601 about an axis 609 running in a lateral direction to the seat. In one suitable embodiment, the side member 603 could also be hinged to the longitudinal upholstery support of the back rest of the seat (not shown).

The internal upholstery support 605 of the side member 603 consists of a plate, the upper and forward edge zones of which are raised in such a manner that they are directed away from the seat portion.

A slot 640, which is concentric to the opening for the passage of the axis 609 provided at the rear end of the internal upholstery support 605 and which secures the internal upholstery support 605 even against an axial movement, is provided in the internal upholstery support 605 near to the front edge zone. A bolt connected to the longitudinal beam support 602 passes through this internal upholstery support 605 and transmits forces exerted on the side member 603 in the lateral direction of the seat into the longitudinal beam support 602 by means of a head which overlaps the slot 640. A second slot 641, which also runs concentrically to the pivot axis 609, is provided near to the upper edge zone at a somewhat smaller distance from the pivot axis 609 than the first slot 640 in the internal upholstery support 605. A bolt 610 connected to the longitudinal beam support 602 and lying parallel to the axis 609 passes through this second slot 641. The bolt 610 forms one locking member of the locking device, by means of which the side member 603 can be adjusted in selectable pivot positions. The bolt 610 has an annular disc collar which overlaps the depressed edge of the slot 641 on the side opposite the seat portion. Therefore, only one end section of the bolt 610 projects above the side of the internal upholstery support 605 facing away from the seat portion.

The second locking member associated with the bolt 610 is formed as a slide 612, which is guided in a guide rail 644 in a longitudinally slidable manner, which guide rail 644 is provided on the internal upholstery support 605 on the side opposite the seat portion. The sliding direction of the slide 612 runs at least approximately in a right angle to the longitudinal extension of the second slot 641. The metal slide 612, formed as a stamped element, is provided in the end section thereof facing the bolt 610, with two detents 645 referenced only in FIG. 16 arranged adjacent each other but spaced from each other in the extension direction of the second slot 641. However, a single detent or a larger number of detents 645 could also be provided. Depending on the pivot position of the side member 603, the end section of the bolt 610 engages in one of the detents 645. In this locked position the slide 612 overlaps the collar of the bolt 610. Therefore, forces acting on the internal upholstery support 605 in the lateral direction of the seat can also be conducted into the longitudinal beam support 602 by means of the bolts 610.

In the exemplary embodiment, the length of the second slot 641 is selected such that the end section of the bolt 610 abuts one long side or the other of the slide 612, when the bolt 610 is located at one end or the other of the second slot 641. Therefore, the side member 603 is also locked by the locking device formed by the bolt 610 and the slide 612, even in these two end positions.

To activate the slide 612, one end of an arcuate, bent plate spring 646 is connected thereto, the other end of which is fixed on the internal upholstery support 605. The plate spring 646 extends approximately in the direction of movement of the slide 612 beyond the end thereof provided with the detents 645, and its curvature is directed toward the outside of the side member 603. There, a pressure plate 647 is embedded in the side member 603, which the seat user can press inward, i.e., against the internal upholstery support 605, for example, in that he grips the side member 603 from above. By means of the pressure exerted on the pressure plate 647, the curvature of the plate spring 646 is decreased. The slide 612 is thereby pushed back, i.e., into its free position, where it releases the bolt 610. When the pressure plate 647 is released, the plate spring 646 regains its original curvature. The side member 603 is therefore again automatically locked. If necessary, an additional slight pivot movement may be necessary, until an engagement under the biasing of the plate spring 646 takes place.

The foregoing preferred embodiments are considered illustrative only. Numerous other modifications and changes will readily occur to those skilled in the pertinent art.

We claim:

1. Vehicle seat, particularly a motor vehicle seat, comprising:
 a seat covered with upholstery;
 an upholstery support for the seat;
 at least one upholstered side member arranged at the side adjacent the seat upholstery for laterally supporting a user of the seat and connected with the upholstery support for the seat so as to be pivotable about a pivot axis running in the lateral direction of the seat;
 an upholstery support for the side member;
 a locking device arranged so that the side member can be fixed in at least two different pivot positions, the cooperating elements of the locking device being connected with the upholstery support for the seat and the upholstery support for the side member respectively;
 said locking device being self-locking in only one pivot direction and being releasable by a release member for pivoting movement of said side member in said pivot direction and including two associated locking members arranged at a distance from the pivot axis, one of which locking members passes by the other member during a pivoting movement of the side member and cooperates therewith in selected positions when the locking device is closed.

2. Vehicle seat according to claim 1, characterized in that the one locking member is a rail which extends at least basically in the direction of movement of the side member.

3. Vehicle seat according to claim 1, characterized in that the one locking member of the two locking members is a rail provided with at least one detent and engages in the other locking member which forms a detent element, said engagement occurring when the locking device is closed.

4. Vehicle seat according to claim 3, characterized in that the rail is a detent rail having detents arranged at distances from each other along its longitudinal direction.

5. Vehicle seat according to claim 4, characterized in that the rail engages in a guide which holds the rail in a form-fitting manner in the lateral direction of the seat.

6. Vehicle seat according to claim 1, characterized in that the distance of the two locking members from the free end of the side member is smaller than the distance from the pivot axis of the side member.

7. Vehicle seat according to claim 5, characterized in that the upholstery support of the side member is a plastic body with which the guide for the detent rail is formed in one piece.

8. Vehicle seat according to claim 4, characterized in that at least one side of the detents provided in one of the detent rail and the detent element which engage in these detents has an angle of inclination lying beyond the self-arresting range of the detent rail.

9. Vehicle seat according to claim 4, characterized in that the detents are formed by respective gaps between two successive, saw-tooth shaped teeth.

10. Vehicle seat according to claim 1, further comprising a return spring which engages on one side against the upholstery support of the side member and on the other side against the upholstery support of the seat, and furthermore exerts a torque on the side member.

11. Vehicle seat according to claim 3, characterized in that the detent element includes a pivotably mounted lever.

12. Vehicle seat according to claim 11, characterized in that the lever includes at least two pivotably connected arms, the pivotability of which relative to each other is limited in one direction by a stop and by a prebiased spring which holds the two arms in a position defined by the stop.

13. Vehicle seat according to claim 11, characterized in that the detent element includes a longitudinally slidably guided detent bolt which is activated by the lever.

14. Vehicle seat according to claim 3, characterized in that the detent element is formed as a slidably movable slide.

15. Vehicle seat according to claim 14, characterized in that the direction of movement of the slide is selected at least approximately radially with respect to the pivot axis of the side member.

16. Vehicle seat according to claim 3, characterized in that the side member is slidable in the direction of its longitudinal extension and is connected with the pivot axis so as to be secured against a rotation about its longitudinal axis, and in that not only the rail, but also the detent element which can be engaged and disengaged by a longitudinal shifting of the side member is rigidly connected with the upholstery support.

17. Vehicle seat according to claim 3, characterized in that the detent element is rigidly connected with the upholstery support for the seat and further characterized in that the one locking member which cooperates with the detent element is movably guided on the upholstery support for the side member so as to be movable laterally to the path of movement of the detent element relative to the one locking member.

18. Vehicle seat according to claim 1, characterized in that the one locking member is formed as a slidably movable slide and the other locking member is formed as a detent element;
   said slide engaging with one end of a plate spring which acts as an activating member and which is curved toward the outside of the side member;
   said plate spring having its other end fixed on the upholstery support of the side member and moves the slide into its released position when the degree of the curvature of the plate spring is decreased.

19. Vehicle seat according to claim 18, characterized in that the upholstery support for the side member is provided with a slot for the passage of the detent element formed as a bolt which includes a collar that engages between the edges of the slot and the slide.

* * * * *